(12) United States Patent
Nagashii

(10) Patent No.: US 6,502,658 B1
(45) Date of Patent: Jan. 7, 2003

(54) ENGINE SUPPORTING STRUCTURE FOR MOTORCYCLE

(75) Inventor: Toshihisa Nagashii, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/652,131

(22) Filed: Aug. 31, 2000

(30) Foreign Application Priority Data

Aug. 31, 1999 (JP) .......................................... 11-245151

(51) Int. Cl.[7] ................................................ B62M 7/02
(52) U.S. Cl. ........................ 180/219; 180/312; 180/291; 180/298
(58) Field of Search ................................ 180/219, 218, 180/312, 311, 291, 298, 300; 280/781

(56) References Cited

U.S. PATENT DOCUMENTS

| | | | |
|---|---|---|---|
| 5,183,130 A | * 2/1993 | Nakamura et al. | 180/219 |
| 5,480,001 A | * 1/1996 | Harra | 180/227 |
| 5,845,728 A | * 12/1998 | Itoh et al. | 180/219 |
| 6,024,185 A | * 2/2000 | Okada et al. | 180/227 |
| 6,189,638 B1 | * 2/2001 | Ito et al. | 180/227 |
| 6,253,868 B1 | * 7/2001 | Horii et al. | 180/227 |
| 6,263,994 B1 | * 7/2001 | Eitel | 180/219 |

FOREIGN PATENT DOCUMENTS

| | | | |
|---|---|---|---|
| EP | 0765800 | * | 4/1997 |
| JP | A533195 | | 5/1993 |
| JP | A2587815 | | 12/1996 |
| JP | A10115226 | | 5/1998 |

* cited by examiner

*Primary Examiner*—Brian L. Johnson
*Assistant Examiner*—J. Allen Shriver
(74) *Attorney, Agent, or Firm*—Birch, Stewart, Kolasch & Birch, LLP

(57) ABSTRACT

To provide an engine supporting structure for a motorcycle, which is capable of integrating an engine with a body frame so as to make the engine effectively function as a member for reinforcing the body frame, while preventing the supporting structure of the engine from being affected by disposition of a chain transmission means. One of two hanger portions located on the side opposed to the side on which a chain transmission is disposed with respect to a vehicular center line has an insertion hole in which an enlarged diameter head on one end side of a through-bolt is to be inserted, and a slit portion which is continuous to the inner surface of the insertion hole and which is opened downwardly. A fastening bolt is screwed in the one hanger portion for narrowing the slit portion to reduce the diameter of the insertion hole after the through-bolt is inserted in the hanger portions and a boss portion in a state in which the axial position of the through-bolt relative to the boss portion is adjusted.

24 Claims, 5 Drawing Sheets

ENGINE SUPPORTING STRUCTURE FOR MOTORCYCLE

BACKGROUND OF THE INVENTION

1. Field of the Invention

The present invention relates to a motorcycle having a boss portion provided on an upper portion of an engine which is interposed between a pair of right and left hanger portions provided on a body frame in such a manner as to project downwardly therefrom. The boss portion is supported by a through-bolt inserted in the hanger portions and the boss portion. A front end portion of a rear swing arm for rotatably supporting a rear wheel is swingably supported by the engine. Furthermore, a chain transmission means for transmitting power of the engine to the rear wheel is disposed on either the right or left side of the engine. In particular, the present invention relates to an improved engine supporting structure for the motorcycle.

2. Description of Background Art

A motorcycle of the above-described type is known, for example, from Japanese Patent Laid-open No. Hei 10-115226, in which an engine is used to function as a member for reinforcing a body frame.

With respect to the above structure for reinforcing the body frame by means of the engine, if a through-bolt is simply inserted in both hanger portions of the body frame and a boss portion of the engine, the engine cannot be certainly integrated with the body frame because a gap occurs between the boss portion and each of the hanger portions. This depends on the accuracy of the width of the boss portion along the axial line of the through-bolt and the accuracy of a gap between the hanger portions. To solve such a problem as disclosed in Japanese Patent Publication No. Hei 5-33195 and Japanese Patent No. 2587815, there has been proposed a structure for integrating an engine with a body frame, characterized in that one of the hanger portions has an insertion hole in which an enlarged diameter head on one end side of a through-bolt is to be inserted, and a slit portion which is continuous to the inner surface of the insertion-hole and which is opened downwardly, wherein after the axial position of the through-bolt relative to the boss portion is adjusted by bringing the enlarged diameter head into direct-contact with the boss portion or interposing a spacer between the boss portion and the enlarged diameter portion, the diameter of the insertion-hole is reduced by narrowing the width of the slit portion, to thereby clamp the enlarged diameter head of the through-bolt in one hanger portion, whereby the engine is integrated with the body frame.

In a motorcycle of a type in which power of an engine is transmitted to a rear wheel via a chain transmission means, a vertical load applied from the engine to hanger portions of a body frame on the side on which the chain transmission means is disposed is larger than a vertical load applied from the engine to the hanger portions on the side opposed to the side on which the chain transmission means is disposed with respect to the engine. Accordingly, if the hanger portion having the above-described slit portion is disposed on the side on which the chain transmission means is disposed, the supporting strength of the engine may be affected by the disposition of the chain transmission means.

SUMMARY OF THE INVENTION

In view of the foregoing, the present invention has been made, and an object of the present invention is to provide an engine supporting structure for a motorcycle, which is capable of integrating an engine with a body frame so as to make the engine effectively function as a member for reinforcing the body frame, while preventing the supporting structure of the engine from being affected by disposition of a chain transmission means.

To achieve the above object, according to the present invention, there is provided an engine supporting structure for a motorcycle including: a boss portion provided on an upper portion of an engine is interposed between a pair of right and left hanger portions provided on a body frame in such a manner as to project downwardly therefrom and is supported by a through-bolt inserted in the hanger portions and the boss portion; a front end portion of a rear swing arm for rotatably supporting a rear wheel is swingably supported by the engine; and a chain transmission means for transmitting a power of the engine to the rear wheel is disposed on either the right or left side of the engine; the engine supporting structure being characterized in that one hanger portion located on the side opposed to the side on which the chain transmission means is disposed with respect to a vehicular center line has an insertion hole in which an enlarged diameter head on one end side of the through-bolt is to be inserted, and a slit portion which is continuous to the inner surface of the insertion hole and which is opened downwardly; and a fastening bolt is screwed in the one hanger portion for narrowing the slit portion to reduce the diameter of the insertion hole after the through-bolt is inserted in the hanger portions and the boss portion in a state in which the axial position of the through-bolt relative to the boss portion is adjusted.

With this configuration, one of the hanger portions has the insertion hole in which the enlarged diameter portion of the through-bolt is to be inserted and the slit portion, wherein after the through-bolt is inserted in the hanger portions and the boss portion in the state in which the axial position of the through-bolt relative to the boss portion is adjusted, the width of the slit portion is narrowed by fastening the fastening bolt, to reduce the diameter of the insertion-hole, thereby clamping the enlarged diameter head of the through-bolt in one hanger portion. As a result, the engine can be integrated with the body frame so as to make the engine effectively function as a member for reinforcing the body frame irrespective of the accuracy of the width of the boss portion along the axial line of the through-bolt and the accuracy of the gap between both the hanger portions. Furthermore, since the hanger portion having the slit portion is disposed on the side opposed to the side on which the chain transmission means is disposed with respect to the vehicular center line, it is possible to avoid a relatively large load being applied to the slit portion resulting from the disposition of the chain transmission means, and hence to prevent the supporting strength of the engine from being affected by the disposition of the chain transmission means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
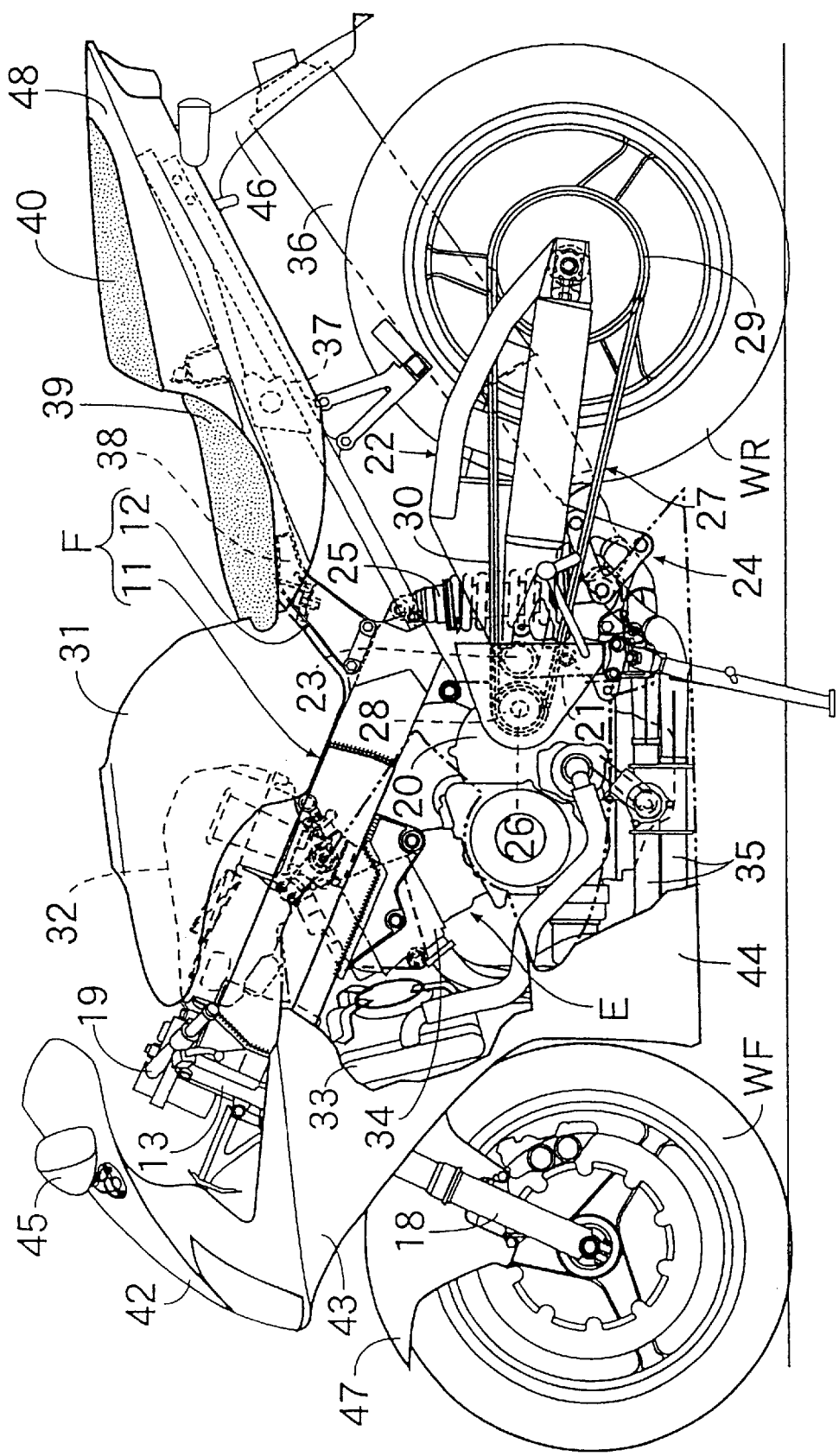
FIG. 1 is a side view of a motorcycle according to the present invention.

Hereinafter, one embodiment of the present invention will be described with reference to the accompanying drawings. Referring first to FIG. 1, a body frame F of the motorcycle according to the present invention includes a front frame 11 on which an engine E is mounted, and a rear frame 12 connected to a rear end portion of the front frame 11. A head pipe 13 is provided at a front end of the front frame 11, and a front fork 18 for rotatably supporting a front wheel WF is steerably supported by the head pipe 13. A handlebar 19 is connected to an upper end of the front fork 18.

The engine E is a multi-cylinder type in which a plurality of cylinders, for example, four cylinders are disposed in parallel along the width direction of the body frame F. The engine E is supported by the front frame 11. An arm supporting member 21 is supported by a rear portion of a crank case 20 of the engine E. A front end portion of a rear swing arm 22 for rotatably supporting a rear wheel WR is swingably supported by the arm supporting member 21 via a supporting shaft 23. A link mechanism 24 is provided between the arm supporting member 21 and the rear swing arm 22. A rear cushion unit or shock absorber 25 is provided between the link mechanism 24 and the rear portion of the front frame 11.

Power from an output shaft 26 of a transmission contained in the engine E is transmitted to the rear wheel WR via chain transmission means 27. The chain transmission means 27 includes a drive sprocket 28 fixed to the output shaft 26, a driven sprocket 29 fixed to the rear wheel WR, and an endless chain 30 wound around the sprockets 28 and 29. The chain transmission means 27 is disposed on the left side of the engine E as seen in the direction of forward movement of the motorcycle.

A fuel tank 31 supported by the front frame 11 and a front portion of the rear frame 12 is disposed over the engine E. An air cleaner 32 is disposed between the fuel tank 31 and the engine E, and a radiator 33 is disposed in front of the engine E.

A plurality of exhaust pipes, for example, four exhaust pipes 35 connected to a cylinder head 34 of the engine E project forwardly from the engine E, curve under the engine E, and extend on the right side of the rear wheel WR. The exhaust pipes 35 are finally connected to an exhaust muffler 36 disposed on the right side of the rear wheel WR.

The rear frame 12 includes a pair of right and left rear stays 37 which extend rearwardly, upwardly from a rear end of the front frame 11, and a pair of right and left seat rails 38 which extend rearwardly, upwardly from the rear end of the front frame 11 while passing over the rear stays 37 and are connected to rear ends of the rear stays 37. A main seat 39 on which a rider is to be seated is supported by the seat rails 38 at a position behind the fuel tank 31, and a pillion seat 40 on which a passenger is to be seated is supported by the seat rails 38 at a position separated rearwardly from the main seat 39.

The front side of the head pipe 13 provided at the front end of the front frame 11 is covered with a synthetic resin made front cowl 42. Both sides of a front portion of the vehicular body are covered with a synthetic resin made center cowl 43 continuous to the front cowl 42. Both sides of a portion, disposed under the engine E, of each of the exhaust pipes 35 are covered with a synthetic resin made lower cowl 44 continuous to the center cowl 43. Rear view mirrors 45 are mounted on the right and left sides of an upper portion of the front cowl 42.

A rear fender 46 for covering the upper side of the rear wheel WR is mounted to the rear frame 12, and a front fender 47 for covering the upper side of the front wheel WF is mounted to the front fork 18. Most of the rear frame 12 and the rear fender 46 are covered with a rear cowl 48.

Figure 2:
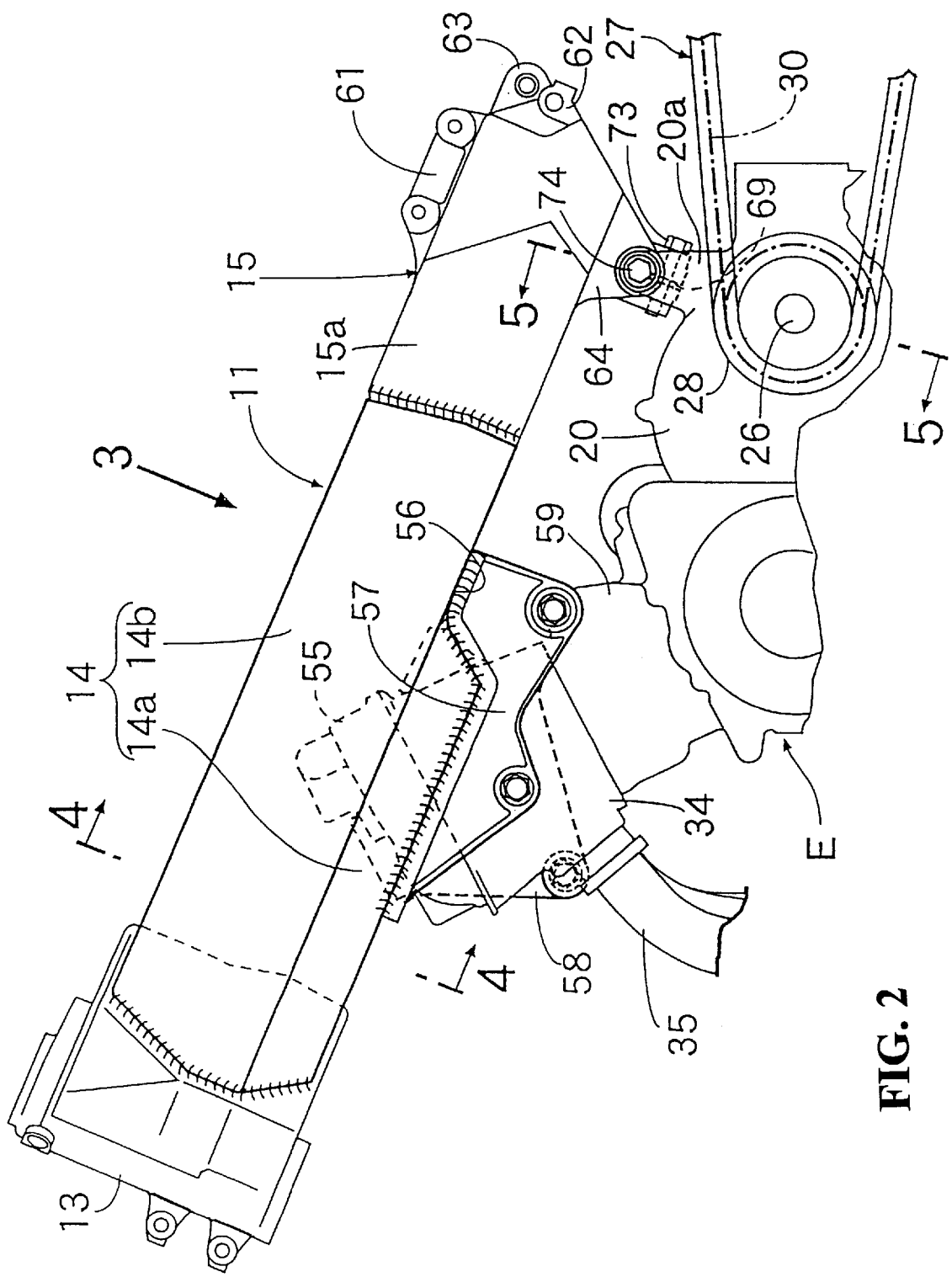
FIG. 2 is an enlarged side view showing part of an engine and a front frame of the motorcycle of FIG. 1.
Figure 3:
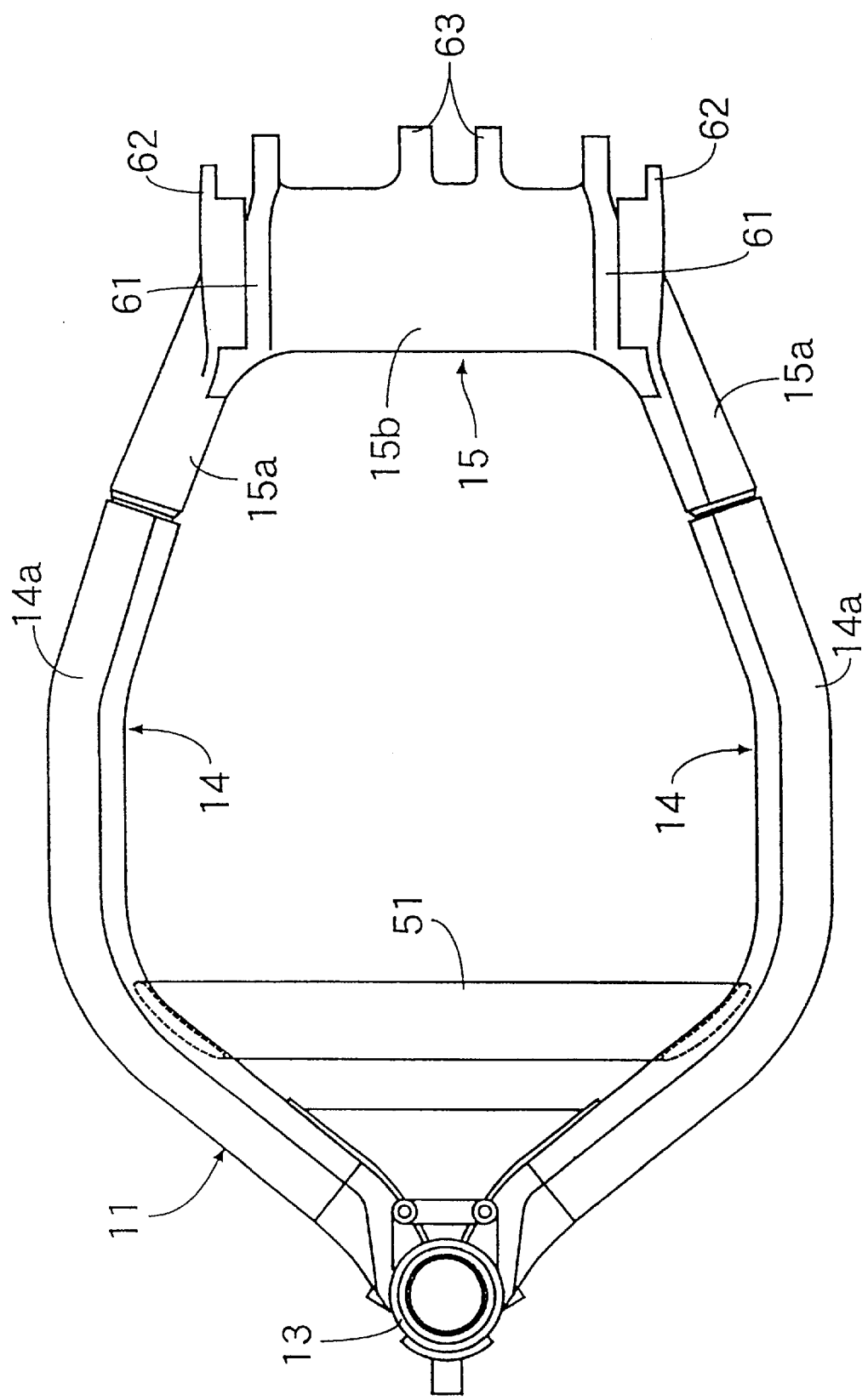
FIG. 3 is a view in the direction shown by an arrow 3 of FIG. 2.
Figure 4:
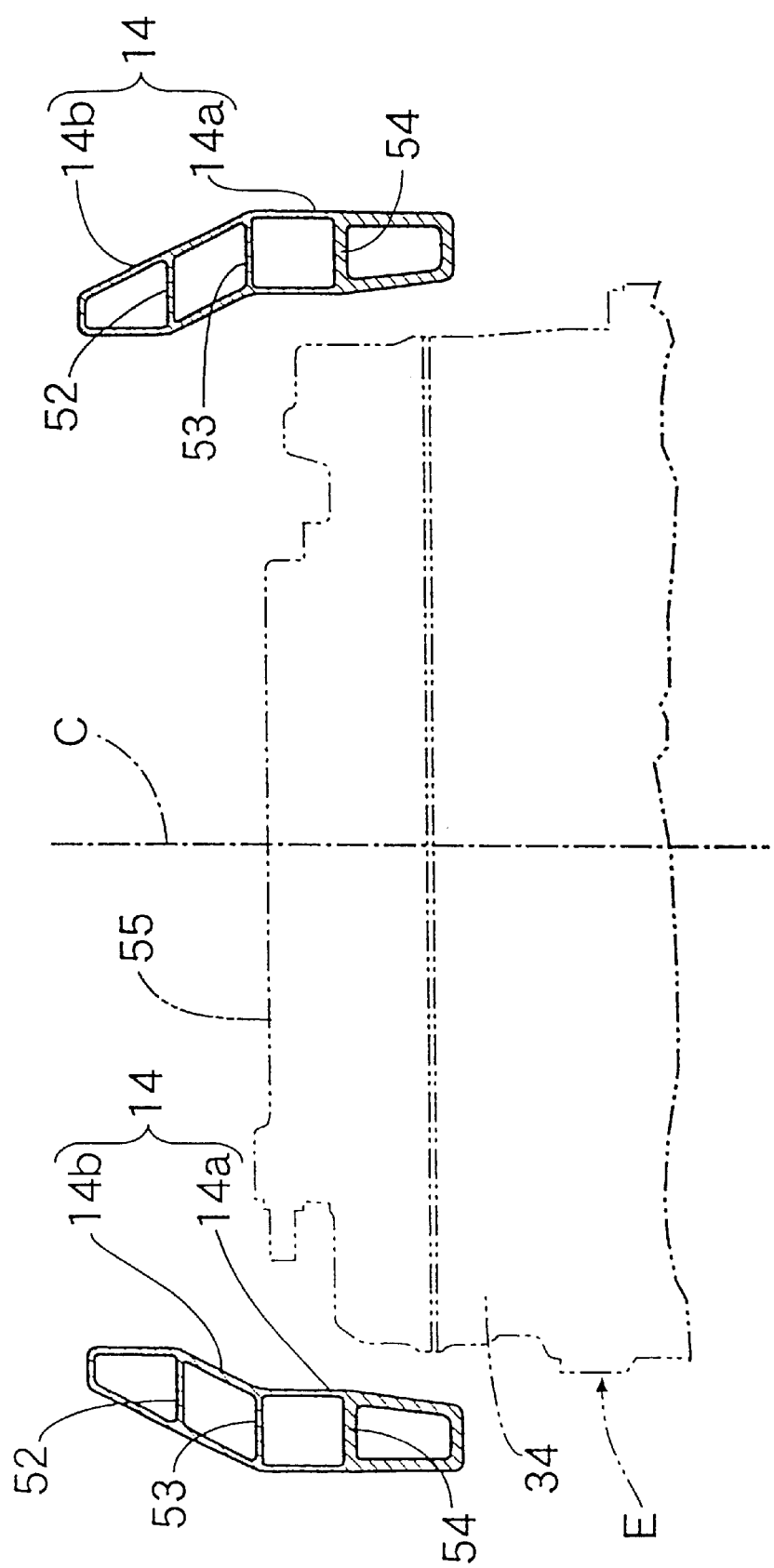
FIG. 4 is a sectional view taken on line 4—4 of FIG. 2, showing a main frame.

Referring to FIGS. 2 to 4, the front frame 11 includes the head pipe 13, a pair of right and left main frames 14 extending rearwardly, downwardly from the head pipe 13, and a bracket 15 for connecting rear ends of the main frames 14 to each other. A supporting stay 51 for supporting the air cleaner 32 is provided between front portions of the main frames 14. The supporting stay 51 serves as a cross-member for reinforcing the main frames 14.

The main frame 14 is formed from an ingot of an aluminum alloy or the like into a hollow square shape by a known extrusion process. The inside of the main frame 14 is vertically partitioned into a plurality of, for example, four parts by integrally providing ribs 52, 53 and 54 on both inner side surfaces of the main frame 14.

A head cover 55 and part of a cylinder head 34, which constitute an upper end portion of the engine E, are disposed between lower portions of the main frames 14. In this viewpoint, the main frames 14 are formed by extrusion into transverse cross-sectional shapes having lower halves 14a extending substantially upright on both sides of the head cover 55 and the cylinder head 34 and upper halves 14b curved from the upper ends of the lower halves 14a toward a vehicular center line C side.

The main frames 14, which have been formed by extrusion as described above, are bent in such a manner that longitudinal intermediate portions of the main frames 14 project outwardly.

An engine supporting member 57 is welded to the back surface of the longitudinal intermediate portion of the left main frame 14, and an engine supporting member 58 is welded to the back surface of the longitudinal intermediate portion of the right main frame 14. In order to avoid interference with the engine E, a lower rear portion of each of the main frames 14 is partially cut in such a manner that the lowermost rib 54 becomes the bottom of the main frame 14, to form a cutout 56. By provision of the cutout 56, an opening is formed on the upper side of the rear end of the rib 54; however, such an opening is closed with the engine supporting member 57 or 58 welded to the main frame 14.

The engine supporting members 57 and 58 are disposed on both sides of the upper end portion of the engine E, and the head cover 55 and the cylinder head 34 of the engine E are fastened to and supported by the engine supporting members 57 and 58, respectively.

The bracket 15 integrally includes a pair of frame side portions 15a disposed over a front end portion of the rear swing arm 22 for rotatably supporting the rear wheel WR and welded to the rear ends of the main frames 14, and a single cross-pipe 15b for connecting both frame side portions 15a to each other. Such a bracket 15 is formed from an aluminum alloy or the like by casting.

Plate portions 61, on which front end portions of the seat rails 38 of the rear frame 12 are to be mounted and fastened, are integrally provided on both frame side portions 15a of the rear end portion of the front frame 11, that is, the bracket 15 in such a manner as to project upwardly therefrom. Plate portions 62, on which front end portions of the rear stays 37 of the rear frame 12 are to be mounted and fastened, are integrally provided on both frame side portions 15a of the bracket 15 in such a manner as to project rearwardly therefrom.

A pair of connection plate portions 63 to be connected to an upper end portion of the rear cushion unit 25 are integrally provided on the cross-pipe portion 15b of the bracket 15 in such a manner as to project rearwardly therefrom.

Figure 5:
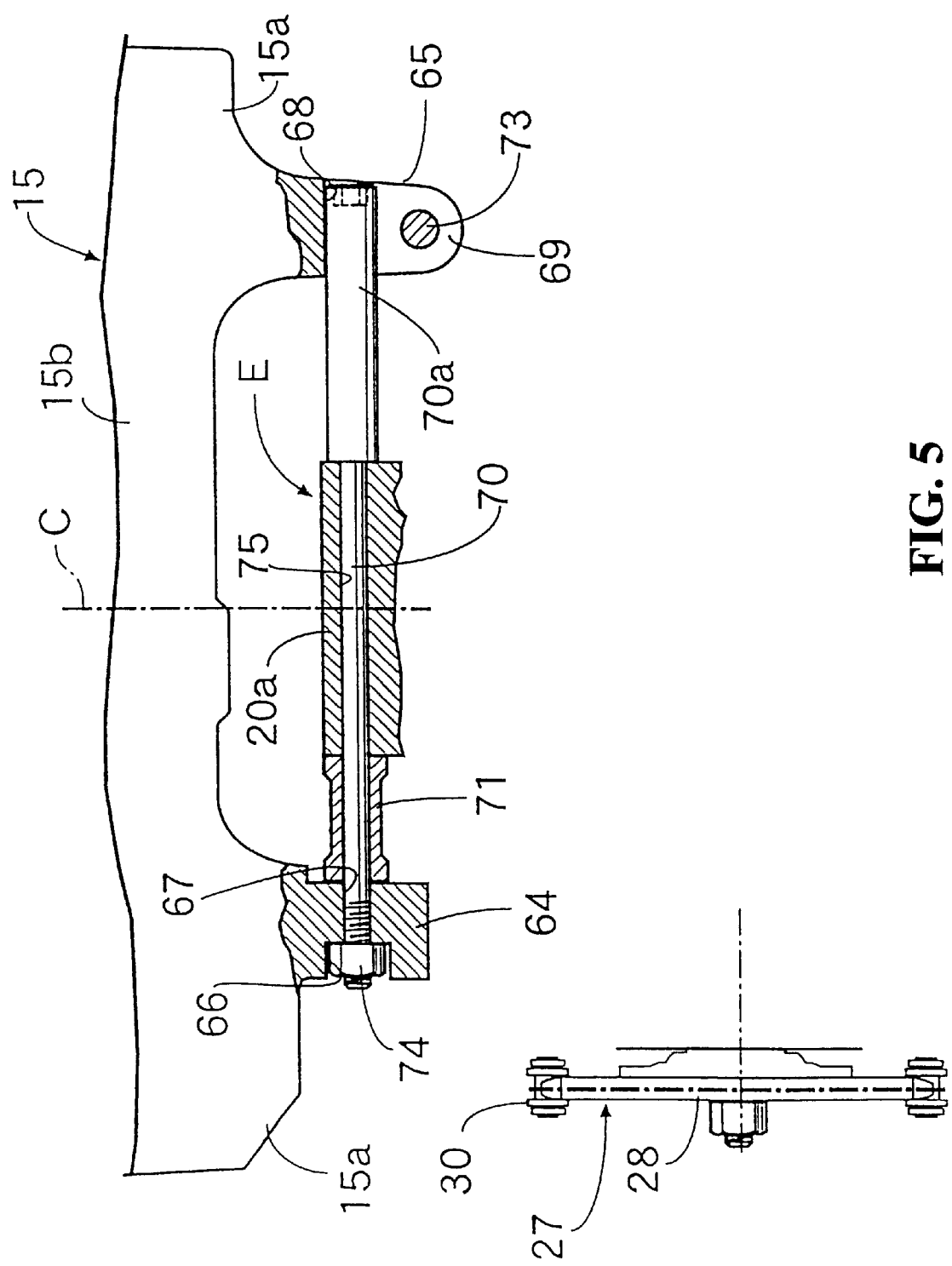
FIG. 5 is a sectional view taken on line 5—5 of FIG. 2.

Referring to FIG. 5, a pair of right and left hanger portions 64 and 65, disposed on both sides of the vehicular center line C, are integrally provided on lower portions of the frame side portions 15a of the bracket 15 in such a manner as to project downwardly therefrom. On the other hand, a boss portion 20a is integrally provided on an upper rear portion of the crank case 20 of the engine E at a position between the hanger portions 64 and 65. The boss portion 20a is supported by the body frame F via a through-bolt 70 having on one end side an enlarged diameter head 70a extending in the axial direction. The through-bolt 70 is inserted in both of the hanger portions 64 and 65 and in the boss portion 20a.

The hanger portion 64, which is located on the same side as the side on which the chain transmission means 27 is disposed with respect to the vehicular center line C (on the left side with respect to the vehicular center line C in this embodiment), has an outer fitting hole 66 and an insertion hole 67 having a diameter smaller than that of the fitting hole 66. A nut 74 screwed with the other end of the through-bolt 70 is fitted in the fitting hole 66 in such a manner as to be non-rotatable around its axial line. The fitting hole 66 and the insertion hole 67 are coaxially disposed for allowing the through-bolt 7 to pass therethrough.

The hanger portion 65, which is located on the side opposed to the side on which the chain transmission means 27 is disposed with respect to the vehicular center line C (on the right side with respect to the vehicular center line C in this embodiment), has an insertion hole 68 for allowing insertion of the enlarged diameter head 70a formed on one side of the through-bolt 70. The insertion hole 68 is disposed coaxially with the fitting hole 66 and the insertion hole 67. The hanger portion 65 also has a slit-portion 69 which is continuous to the inner surface of the insertion hole 68 and which is opened downwardly.

A fastening bolt 73, which is capable of reducing the diameter of the insertion hole 68 by narrowing the width of the slit portion 69, is screwed in the hanger portion 65. By fastening the fastening bolt 73 to the hanger portion 65, the enlarged diameter head 70a of the through-bolt 70 can be pressedly held by the hanger portion 65.

The boss portion 20a has an insertion hole 75 coaxial with the fitting hole 66 and the insertion holes 67 and 68. A cylindrical spacer 71 for allowing the through-bolt 70 to pass therethrough is interposed between the boss portion 20a and the hanger portion 64. The through-bolt 70 is inserted from the hanger portion 66 side into the insertion holes 68 and 75, spacer 71, and the insertion holes 67 and 66. The enlarged diameter head 70a has an outside diameter insertable into the insertion hole 68 but not insertable into the insertion hole 75. In this way, by fastening the nut 74 to the other end of the through-bolt 70 until the enlarged diameter head 70a fitted in the insertion hole 68 of the hanger portion 65 comes into contact with the boss portion 20a, the axial position of the throughbolt 70 relative to the boss portion 20a is adjusted.

The function of this embodiment will be described below. The front frame 11 constituting the body frame F in co-operation with the rear frame 12 includes the head pipe 13 for steerably supporting the front wheel WF, the pair of right and left main frames 14 extending rearwardly, downwardly from the head pipe 13, and the bracket 15 for connecting the rear ends of the main frames 14 to each other. The bracket 15, which is formed by casting, integrally includes the pair of frame side portions 15a welded to the rear ends of the main frames 14 and the single cross-pipe portion 15b for connecting the frame side portions 15a to each other. The upper portion of the engine E is supported by the main frames 14 and the frame side portions 15a. Furthermore, the front end portion of the rear swing arm 22 for rotatably supporting the rear wheel WR is swingably supported by the engine E at a position under the frame side portions 15a.

Since the upper portion of the engine E is supported by the main frames 14 and the bracket 15, the front frame 11 of the body frame F can eliminate the necessity of provision of down tubes which have been required to be provided. Instead only the main frames 14 and the bracket 15 which is formed by casting and which integrally includes the pair of frame side portions 15a and the single cross-pipe portion 15b are necessary. As a result, it is possible to make the front frame 11 compact while reducing the number of parts of the front frame 11 and also reducing the weight of the front frame 11. Since the welding step for connecting the frame side portions 15a to each other by means of the cross-pipe portion 15b can be eliminated and also the work required to connect the down tubes which have been required can be eliminated, it is possible to reduce the number of assembling steps of the front frame 11. Since the front end portion of the rear swing arm 22 for rotatably supporting the rear wheel WR is swingably supported by the engine E and the frame side portions 15a are disposed over the front end portion of the rear swing arm 22, the bracket 15 integrally including the frame side portions 15a and the cross-pipe portion 15b can be formed by casting using a relatively small-sized mold, with the result that it is possible to decrease the cost of casting.

Since the main frame 14 is formed by extrusion into the transverse sectional shape having the lower half 14a extending substantially upright on both sides of the upper end portion of the engine E and the upper half 14b bent from the upper end of the lower half 14a onto the vehicular center line C side, the upper half 14b of the main frame 14 is tilted onto the vehicular center line C side. Accordingly, it is possible to narrow the width between the upper portions of the main frames 14 while ensuring space for disposing the upper end portion of the engine E between the lower portions of the right and left main frames 14, and hence to make the vehicular body compact. Furthermore, since the main frame 14 is formed by extrusion, the transverse sectional shape of the main frame 14 can be kept constant over the entire length in the longitudinal direction upon extrusion, with a result that it is possible to prevent the rigidity of the main frame 14 from being reduced.

The pair of right and left hanger portions 64 and 65 are provided on the bracket 15 of the body frame F in such a manner as to project downwardly therefrom. Of these hanger portions 64 and 65, the hanger portion 65 disposed on the side opposed to the side on which the chain transmission means 27 is disposed with respect to the vehicular center line C has the insertion hole 68 for allowing the enlarged diameter head 70a formed on one end side of the through-bolt 70 to pass therethrough, and the slit-portion 69 which is continuous to the inner surface of the insertion hole 68 and which is opened downwardly, wherein the fastening bolt 73, which is capable of reducing the diameter of the insertion hole 68 by narrowing the width of the slit portion 69, is screwed in the hanger portion 65. Furthermore, the spacer 71 is interposed between the hanger 64 and the boss portion 20a, and the through-bolt 70 is inserted in both of the hanger portions 64 and 65 and in the boss portion 20a with the axial position relative to the boss portion 20a adjusted.

Accordingly, by fastening the fastening bolt 73 in such a manner as to narrow the width of the slit portion 69 in the state in which the through-bolt 70 is inserted in both of the hanger portions 64 and 65 and in the boss portion 20a with the axial position relative to the boss portion 20a of the crank case 20 of the engine E adjusted, the diameter of the insertion-hole 68 can be reduced and thereby the enlarged diameter head 70a can be pressedly held by the hanger portion 65. As a result, the body frame F can be integrated with the engine E and thereby the engine E is allowed to effectively function as the member for reinforcing the body frame F, irrespective of the accuracy of the width of the boss portion 20a and the accuracy of the gap between the hanger portions 64 and 65 in the direction along the axial line of the through-bolt 70. Furthermore, since the hanger portion 65 having the slit portion 69 is disposed opposite to the chain transmission means 27 with respect to the vehicular center line C, it is possible to avoid a relatively large load being applied to the slit portion 69 resulting from the disposition of the chain transmission means 27, and hence to prevent the supporting strength of the engine E from being affected by the disposition of the chain transmission means 27.

While the embodiment of the present invention has been described in detail, the present invention is not limited thereto, and it is to be understood that various changes in design may be made without departing from the scope of claims.

For example, in the above-described embodiment, the axial position of the through-bolt 70 relative to the boss portion 20a is adjusted by interposing the spacer 71 between the boss portion 20a of the engine E and the hanger portion 64 and bringing the enlarged diameter head 70a into contact with the boss portion 20a; however, the axial position of the through-bolt 70 relative to the boss portion 20a may be adjusted by bringing the enlarged diameter portion 70a into contact with the boss portion 20a in a state in which the boss portion 20a is brought into contact with the hanger portion 64.

As described above, according to the present invention, it is possible to integrate the engine with the body frame so as to make the engine effectively function as a member for reinforcing the body frame irrespective of the accuracy of the width of the boss portion along the axial line of the through-bolt and the accuracy of the gap between the hanger portions, and to avoid a relatively large load being applied to the slit portion resulting from the disposition of the chain transmission means and hence to prevent the supporting strength of the engine from being affected by the disposition of the chain transmission means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine supporting structure for a motorcycle, the motorcycle including an engine, a body frame, a rear swing arm for rotatably supporting a rear wheel, and a chain transmission for transmitting power of said engine to said rear wheel, the chain transmission being disposed on either the right or left side of said engine, said engine supporting structure comprising:

a boss portion provided on an upper portion of the engine;

a pair of hanger portions provided on right and left sides of the body frame of the motorcycle, respectively, and projecting downwardly therefrom, said boss portion being interposed between said pair of hanger portions and being supported by a through-bolt inserted through said pair of hanger portions and said boss portion, one of said hanger portions is located on a side opposed to a side on which the chain transmission is disposed with respect to a center line of the motorcycle, said one hanger portion having an insertion hole for receiving an enlarged diameter head on one end side of said through-bolt, and a slit portion continuous to an inner surface of said insertion hole and opened downwardly; and a fastening bolt screwed in said one hanger portion for narrowing said slit portion to reduce a diameter of said insertion hole, wherein said fastening bolt is screwed in said one hanger portion after said through-bolt has been inserted through said pair of hanger portions and said boss portion after an axial position of said through-bolt relative to said boss portion has been adjusted.

2. The engine supporting structure for a motorcycle according to claim 1, wherein the other of said hanger portions includes an outer fitting hole and an insertion hole, said outer fitting hole for receiving a nut threaded on the other end side of said through-bolt, and said insertion hole in said other of said hanger portions being for receiving a narrow portion of said through-bolt.

3. The engine supporting structure for a motorcycle according to claim 1, further comprising: a spacer supported on said through-bolt between the other of said hanger portions and said boss portion.

4. The engine supporting structure for a motorcycle according to claim 1, wherein said pair of hanger portions form a space therebetween, and said boss portion, said enlarged diameter portion and a spacer are located in said space to fill said space and prevent movement of said boss portion in an axial direction of said through-bolt with respect to said pair of hanger portions.

5. The engine supporting structure for a motorcycle according to claim 3, wherein said pair of hanger portions form a space therebetween, and said boss portion, said enlarged diameter portion and said spacer are located in said space to fill said space and prevent movement of said boss portion in an axial direction of said through-bolt with respect to said pair of hanger portions.

6. The engine supporting structure for a motorcycle according to claim 2, further comprising: a spacer supported on said through-bolt between the other of said hanger portions and said boss portion.

7. The engine supporting structure for a motorcycle according to claim 2, wherein said nut is fitted in said fitting hole in a non-rotatable manner around an axial line thereof.

8. The engine supporting structure for a motorcycle according to claim 1, wherein said slit portion is formed vertically on said one hanger portion.

9. An engine supporting structure for a motorcycle, comprising:

a boss portion provided on an upper portion of an engine;

a pair of hanger portions provided on right and left sides of a body frame of the motorcycle, respectively, and projecting downwardly therefrom, said boss portion being interposed between said pair of hanger portions and being supported by a through-bolt inserted through said pair of hanger portions and said boss portion, one of said hanger portions is located on a side opposed to a side on which a chain transmission of said engine is disposed with respect to a center line of the motorcycle, said one hanger portion having an insertion hole for receiving an enlarged diameter head on one end side of said through-bolt, and a slit portion continuous to an inner surface of said insertion hole and opened downwardly; and a fastening bolt screwed in said one hanger portion for narrowing said slit portion to reduce a diameter of said insertion hole, wherein said fastening bolt is screwed in said one hanger portion after said through-bolt has been inserted through said pair of hanger portions and said boss portion after an axial position of said through-bolt relative to said boss portion has been adjusted.

10. The engine supporting structure for a motorcycle according to claim 9, wherein the other of said hanger portions includes an outer fitting hole and an insertion hole, said outer fitting hole for receiving a nut threaded on the other end side of said through-bolt, and said insertion hole in said other of said hanger portions being for receiving a narrow portion of said through-bolt.

11. The engine supporting structure for a motorcycle according to claim 9, further comprising: a spacer supported on said through-bolt between the other of said hanger portions and said boss portion.

12. The engine supporting structure for a motorcycle according to claim 9, wherein said pair of hanger portions form a space therebetween, and said boss portion, said enlarged diameter portion and a spacer are located in said space to fill said space and prevent movement of said boss portion in an axial direction of said through-bolt with respect to said pair of hanger portions.

13. The engine supporting structure for a motorcycle according to claim 11, wherein said pair of hanger portions form a space therebetween, and said boss portion, said enlarged diameter portion and said spacer are located in said space to fill said space and prevent movement of said boss portion in an axial direction of said through-bolt with respect to said pair of hanger portions.

14. The engine supporting structure for a motorcycle according to claim 10, further comprising: a spacer supported on said through-bolt between the other of said hanger portions and said boss portion.

15. The engine supporting structure for a motorcycle according to claim 9, wherein said nut is fitted in said fitting hole in a non-rotatable manner around an axial line thereof.

16. The engine supporting structure for a motorcycle according to claim 9, wherein said slit portion is formed vertically on said one hanger portion.

17. A motorcycle, comprising:

an engine, said engine having a boss portion provided on an upper portion thereof;

a body frame;

a rear swing arm for rotatably supporting a rear wheel;

a chain transmission for transmitting power of said engine to said rear wheel, said chain transmission being disposed on either a right or left side of said engine; and an engine supporting structure, said engine supporting structure including:

a pair of hanger portions provided on right and left sides of said body frame, respectively, and projecting downwardly therefrom, said boss portion being interposed between said pair of hanger portions and being supported by a through-bolt inserted through said pair of hanger portions and said boss portion, one of said hanger portions is located on a side opposed to a side on which the chain transmission is disposed with respect to a center line of the motorcycle, said one hanger portion having an insertion hole for receiving an enlarged diameter head on one end side of said through-bolt, and a slit portion continuous to an inner surface of said insertion hole and opened downwardly; and a fastening bolt screwed in said one hanger portion for narrowing said slit portion to reduce a diameter of said insertion hole, wherein said fastening bolt is screwed in said one hanger portion after said through-bolt has been inserted through said pair of hanger portions and said boss portion after an axial position of said through-bolt relative to said boss portion has been adjusted.

18. The motorcycle according to claim 17, wherein the other of said hanger portions includes an outer fitting hole and an insertion hole, said outer fitting hole for receiving a nut threaded on the other end side of said through-bolt, and said insertion hole in said other of said hanger portions being for receiving a narrow portion of said through-bolt.

19. The motorcycle according to claim 17, further comprising: a spacer supported on said through-bolt between the other of said hanger portions and said boss portion.

20. The motorcycle according to claim 17, wherein said pair of hanger portions form a space therebetween, and said boss portion, said enlarged diameter portion and a spacer are located in said space to fill said space and prevent movement of said boss portion in an axial direction of said through-bolt with respect to said pair of hanger portions.

21. The motorcycle according to claim 19, wherein said pair of hanger portions form a space therebetween, and said boss portion, said enlarged diameter portion and said spacer are located in said space to fill said space and prevent movement of said boss portion in an axial direction of said through-bolt with respect to said pair of hanger portions.

22. The motorcycle according to claim 18, further comprising: a spacer supported on said through-bolt between the other of said hanger portions and said boss portion.

23. The motorcycle according to claim 17, wherein said nut is fitted in said fitting hole in a non-rotatable manner around an axial line thereof.

24. The motorcycle according to claim 17, wherein said slit portion is formed vertically on said one hanger portion.

* * * * *